(12) United States Patent
Misra et al.

(10) Patent No.: US 6,540,974 B2
(45) Date of Patent: *Apr. 1, 2003

(54) PROCESS FOR MAKING MIXED METAL OXIDES

(75) Inventors: Sudhanshu Misra, Orlando, FL (US); Pradip Kumar Roy, Orlando, FL (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/917,365

(22) Filed: Jul. 27, 2001

(65) Prior Publication Data

US 2001/0040785 A1 Nov. 15, 2001

Related U.S. Application Data

(63) Continuation of application No. 09/533,428, filed on Mar. 23, 2000, now Pat. No. 6,312,565.

(51) Int. Cl.[7] .................................................. C01F 7/02
(52) U.S. Cl. ....................................... 423/600; 423/593
(58) Field of Search ................................ 423/600, 593; 204/157.51, 157.5

(56) References Cited

U.S. PATENT DOCUMENTS

| 4,483,751 | A | * | 11/1984 | Murayama et al. | |
| 4,668,299 | A | * | 5/1987 | Nanao et al. | 423/593 |
| 4,830,879 | A | * | 5/1989 | Debsikdar | 422/376.2 |
| 5,654,456 | A | * | 8/1997 | Scott et al. | |
| 6,235,260 | B1 | * | 5/2001 | Toki et al. | 423/593 |
| 6,312,565 | B1 | * | 11/2001 | Misra et al. | |

FOREIGN PATENT DOCUMENTS

WO 98/54094 * 12/1998

* cited by examiner

*Primary Examiner*—Steven Bos

(57) ABSTRACT

Tantalum and niobium aluminate mixed metal oxides may be made by a process comprising mixing a first metal compound selected from the group consisting of aluminum alkoxide, aluminum beta-diketonate, aluminum alkoxide beta-diketonate, and mixtures thereof with a second metal compound selected from the group consisting of niobium alkoxide, niobium beta-diketonate, niobium alkoxide beta-diketonate, tantalum alkoxide, tantalum beta-diketonate, tantalum alkoxide beta-diketonate, and mixtures thereof to provide a precursor and then hydrolyzing the mixture. The resulting mixed metal oxide may be used in a variety of components of integrated circuits.

8 Claims, No Drawings

PROCESS FOR MAKING MIXED METAL OXIDES

This continuation application of Ser. No. 09/533,428 claims the benefit of now U. S. Pat. No. 6,312,565, entitled, "THIN FILM DEPOSITION OF MIXED METAL OXIDES," to Sudhanshu Misra and Pradip Kumar Roy, filed on Mar. 23, 2000, commonly assigned with the present invention and incorporated herein by reference as if reproduced herein in its entirety.

BACKGROUND OF THE INVENTION

Integrated circuits in general, and CMOS devices in particular, have continued to gain wide spread usage as user demands for increased functionality and enhanced benefits continue to increase. In order to meet this demand, the integrated circuit industry continues to decrease the feature size of circuit structures in order to place more circuits in the same size integrated circuit area thereby continuously increasing the packing density for a given chip size. Over the last several years, structures have evolved from 1.2 micron gate lengths (1 Mbit capacity), down to gate feature sizes of 0.25 microns (1 Gbit capacity) and less.

For example, the ever-increasing demand for computer memory to facilitate calculations and data storage has fostered intense development efforts in the area of Dynamic Random Access Memory (DRAM), and especially embedded DRAM. The DRAM is generally a collection of transistor devices with each having an integrated circuit capacitor typically connected to its source electrode thereby forming a memory cell. This collection of memory cells is then arranged into a memory structure using a word line and a bit line to address each memory cell. This integrated capacitor may store an electrical charge to represent a binary "1" or store no electrical charge for a binary "0" as instructed by the word and bit control lines.

Construction of these memory capacitors consists of using typically a tungsten, copper or aluminum electrode structure, either parallel to the wafer surface, in a trench, or as a plug for 0.25 micron technology, connected to the source of the transistor, which then supports a dielectric material, such as tantalum pentoxide ($Ta_2O_5$), and then a top electrode, in sequence.

As the size technology of CMOS devices continues to shrink, the structure for a given memory size or circuit capability also shrinks as noted above. For example, the bond pads, which allow the integrated circuit to connect to external circuitry, cannot continue to shrink indefinitely. Currently, an integrated circuit package may have about 200 bond pads that are 50 microns by 50 microns in size. Shrinking topology coupled with this bond pad lower size limitation results in an excess of empty space around the bond pads. This allows for the inclusion of additional embedded memory around the bond pads. The use of higher dielectric constant oxides such as tantalum pentoxide as substitutes for silicon dioxide have allowed smaller structures still.

Tantalum pentoxide is an illustrative high-K (high dielectric constant) material used in integrated circuit elements such as gate and capacitor dielectrics. The dielectric is sandwiched between two electrodes to form a capacitor or between the gate and channel in a field effect device. However, there is a drawback to tantalum pentoxide used on aluminum electrodes. With time and temperature, the aluminum acts as a reducing agent to the tantalum pentoxide, forming aluminum oxide and reducing the tantalum pentoxide to tantalum suboxide, which is less of an insulator, and even to tantalum metal, which is a conductor. This conversion impairs the dielectric properties of the tantalum pentoxide and reduces the performance of any capacitors made with it due to leakage currents associated with tantalum metal shorts. The problem is particularly severe in capacitors formed on semiconductor wafers as part of an integrated circuit, because processing temperatures subsequent to dielectric deposition can approach the melting point of aluminum.

One approach to reducing the reactivity of tantalum pentoxide with aluminum is to pre-dope the tantalum pentoxide with about 1 to about 50 mole % aluminum oxide, preferably 1 to 20% mole % aluminum oxide. The presence of the reaction product, aluminum oxide, in the tantalum oxide, reduces the thermodynamic tendency for the reaction to go forward. The greater the amount of aluminum oxide, the greater the inhibition of reduction, but the lower the dielectric constant. Tantalum pentoxide is normally deposited by chemical vapor deposition at elevated temperature when making integrated circuit capacitors, and is desirably amorphous as deposited. The presence of aluminum provides a benefit to capacitors with non-aluminum electrodes in that aluminum doping increases the crystal phase transformation temperature of tantalum pentoxide from 850 to 950° C., allowing for higher temperature post-processing without crystallization of the tantalum pentoxide. Tantalum pentoxide powder may also be sintered to form monolithic ceramic capacitor dielectric pieces, which then have electrodes metallized thereon.

Accordingly, it would be desirable if mixed tantalum aluminum oxide could be made in a low temperature spin-on form for use in aluminum electrode capacitors. It would also be desirable if a porous tantalum aluminum oxide could be had, since such a structure could be infiltrated with yet another high-K metal oxide precursor.

SUMMARY OF THE INVENTION

Tantalum and niobium aluminate mixed metal oxides may be made by a process comprising combining an aluminum first compound selected from the group consisting of aluminum alkoxide, aluminum diketonate, aluminum alkoxide diketonate, and mixtures thereof with a metal second compound selected from the group consisting of niobium alkoxide, niobium diketonate, niobium alkoxide diketonate, tantalum alkoxide, tantalum diketonate, tantalum alkoxide diketonate, and mixtures thereof to provide a precursor and then hydrolyzing the precursor and removing volatile components.

DETAILED DESCRIPTION

A precursor of tantalum and aluminum oxide is illustratively made by the interaction of an organotantalum or organoniobium reactant such as tantalum alkoxide betadiketonate and an organoaluminum reactant such as aluminum alkoxide (1:1 mole ratio or greater) in a non-aqueous solvent like benzene for 8 hours under exposure to UV light at 80° C. While not completely understood, and not wishing to be held to any theory, it is believed that a heterobimetallic precursor is formed, perhaps through transesterification. The heterobimetallic precursor is then hydrolyzed by adding a mixture 50 wt.% acetone, 20 wt. % dimethylformamide, 20 wt. % isopropanol and 10 wt. % water, which undergoes condensation to form a yellowish gel in a surprising slow, controlled fashion. Hydrolysis converts the metal alkoxide to metal hydroxide and yields the corresponding alcohol, while condensation is the reaction of metal hydroxides to form oxides while liberating water. Note that aluminum alkoxide has much greater reactivity toward water than tantalum alkoxide beta-diketonate, and that one would expect that adding an aqueous solvent in the presence of both would result in undesirable instantaneous local gellation of the aluminum alkoxide due to the aluminum alkoxide being exposed locally, at the point of addition, to a large molar excess of the water required for gellation. The resulting gel would be undesirably non-stoichiometric with respect to the starting ratio of tantalum to aluminum due to the tendency of the slower reacting tantalum alkoxide beta-diketonate to be excluded from the gel. However, imposing the reaction conditions of the present invention upon the organoaluminum and organotantalum compounds results in a precursor that can avoid instant local gellation upon hydrolysis and react instead in a slow, controlled fashion.

An exemplary organoaluminum reactant is either aluminum alkoxide or aluminum alkoxide beta-diketonate or aluminum beta-diketonate. Beta-diketonate is intended herein to mean not just the complex of metal with acetylacetone, 2,4-pentanedione, but also includes complexes with other beta-keto compounds including ethylacetylacetone, hexafluoropentanedione, 2,2,6,6-tetramethyl-3,5-heptanedione, 6,6,7,7,8,8,8,-heptafluoro-2,2-dimethyl-3,5-octanedione, 9-octadecynylacetylacetone, benzoylacetone, benzoyltrifluoracetone, 1,3-diphenyl-1,3-propanedione, methacryloxyacetylacetone, theonyltrifluoroacetone, trimethylacetylacetone, allylacetylacetone and methacryloxyethylacetylacetone. Examples of aluminum alkoxides, aluminum alkoxide beta-diketonates and aluminum beta-diketonates include aluminum n-butoxide, aluminum s-butoxide, aluminum sbutoxide bis (ethylacetoacetate), aluminum t-butoxide, aluminum disbutoxide ethylacetoacetate, aluminum diisopropoxide ethylacetoacetate, aluminum ethoxide, aluminum ethoxyethoxyethoxide, aluminum hexafluoropentanedionate, aluminum isopropoxide, aluminum 9-octadecenylacetoacetate diisopropoxide, aluminum 2,4-pentanedionate, and aluminum 2,2,6,6-tetramethyl-3,5-heptanedionate. Aluminum alkoxides are preferred, and aluminum isopropoxide is particularly preferred.

An exemplary organotantalum or organoniobium reactant is selected from niobium alkoxide, niobium beta-diketonate, niobium alkoxide beta-diketonate, tantalum alkoxide, tantalum beta-diketonate and tantalum alkoxide beta-diketonate. Examples include niobium V n-butoxide, niobium V ethoxide, niobium V methoxide, niobium V tetraethoxide pentanedionate, niobium V trifluoroethoxide, tantalum V n-butoxide, tantalum V ethoxide, tantalum V methoxide, tantalum V tetraethoxide pentanedionate and tantalum V trifluoroethoxide. Preferred are niobium alkoxide beta-diketonate and tantalum alkoxide beta-diketonate and especially preferred are niobium isopropoxide acetylacetonate and tantalum isopropoxide acetylacetonate. Note that, in comparison to tantalum oxide, niobium oxide also provides a high K material, but moreover, is expected to provide improved compatibility with lithium niobate substrates.

Note that the desired amount of aluminum in the aluminum plus tantalum/niobium heterometallic precursor is preferably 50 mole % or less and most preferably about 1 to about 20 mole % aluminum, so that the $(Ta, Nb)_x Al_y O_z$ obtained has y£x.

The solvent that the organometallic reactants are dissolved in is preferably hydrophobic, so that the organoaluminum reactant is not hydrolyzed by any aqueous contamination in the solvent prior to precursor formation. Benzene is preferred.

The reaction time is up to 8 hours, 8 hours being preferred when the reaction temperature is 80° C. The reaction time can be expected to increase as the temperature is lowered. Note that 80° C. is the boiling point of benzene, so that a reflux setup may be used. Also, solvents of higher boiling point, such as toluene and xylene, may be used to shorten reaction time.

Note that once the precursor is obtained, hydrolysis need not be induced by the addition of liquid water. Rather, the precursor can be spun-on a substrate and allowed to hydrolyze by contact with atmospheric moisture.

However, if liquid water is used to hydrolyze the precursor, then it is preferably mixed with a solvent that will solubilize the water in the benzene, as the benzene was specifically selected for its hydrophobic character, and water is not soluble in it. Suitable solvents are those that are miscible with both water and benzene, such as alcohols, isopropanol being preferred, ketones, acetone being preferred, aprotic solvents such as dimethylacetamide, dimethylsulfoxide and N-methylpyrrolidone, dimethylformamide being preferred. Particularly preferred is a mixture of 50 wt. % acetone, 20% dimethylformamide, 20% isopropanol and 10% water. The amount of water needed to form a monolith of tantalum/niobium aluminum mixed metal oxide is one mole of water per alkoxide group. However, if the mixture is rich with tantalum or niobium alkoxide, it may take as little as a half a mole per alkoxide group to get complete hydrolysis and condensation. This is because although hydrolysis consumes one mole of water to obtain a hydroxyl group, condensation with an another hydroxyl to obtain an oxide liberates a half mole of water, giving a net requirement of a half mole (Aluminum hydroxide requires heat to accomplish condensation, whereas tantalum/niobium hydroxide is difficult to isolate). Water in excess of the stoichiometric amount is not deleterious, but it is another source of volatile components (like the solvents), that are removed later.

When a spin-on formulation is desired, a substoichiometric amount of water may be desirable. Partial hydrolysis and condensation speeds cure time on the substrate (since some of the reaction has already occurred) reduces evaporation loss of reactants (since the molecular weight has increased) and reduces shrinkage on cure. About 0.1 to about 0.5 moles of water per mole of alkoxide group is preferred to prevent gellation, with 0.3 moles being particularly preferred. When the precursor is completely hydrolyzed, it condenses to form a gel which can be converted into monoliths, thin films, fibers, crystals, powders and micro-, meso- and nanoporous materials. Which is obtained depends on starting shape, solvent removal and subsequent thermal processing. If a thin film is poured immediately subsequent to the addition of the hydrolyzing mixture, a substantially non-porous film can be formed due to the ease of solvent escape by diffusion. However, volatile components such as solvent, the alcohols obtained from the alkoxide groups, acetylacetone and water can only escape from macroscopic gels through pores, and solvent exchange, temperature and vacuum can be used to modify pore size. Porous tantalum aluminum oxides and porous niobium aluminum oxides can be modified by infiltrating them with other metal oxide precursors prior to sintering to enable the production of tertiary and higher oxides that are not necessarily compatible if made with purely thermal techniques. Once obtained, the gels can be sintered for densification at temperatures significantly lower than those required for oxides made from oxide powders. Both the spin-on and monolithic formulas provided are particularly advantageous when used as a capacitor dielectric in contact with aluminum electrodes.

EXAMPLE

A heterobimetallic precursor of niobium and aluminum (1:1 mole ratio) is made by the interaction of niobium (OiPr)$_3$ acetylacetonate and aluminum (OiPr)$_3$ in benzene at 80° C. for 8 hours under exposure to UV light. The heterobimetallic precursor is then hydrolyzed by adding a mixture 50 wt. % acetone, 20 wt. % dimethylformamide, 20 wt. % isopropanol and 10 wt. % water, which leads to the formation of a yellowish gel in a slow, controlled fashion. The yellow gel obtained contains niobium aluminum oxide, NbAlO$_4$.

The foregoing has disclosed preferred and alternative features and embodiments of the present invention so that one of ordinary skill in the art may better understand the detailed description of the invention that follows. Additional features of the invention will be described hereinafter that form the subject of the claims of the invention. One of ordinary skill in the art having the benefit of the present disclosure can appreciate that he can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

What is claimed is:

1. A process for making a mixed metal oxide, comprising:

forming a precursor by mixing a first organometallic reactant with a second organometallic reactant in a non-aqueous solvent;

hydrolyzing the precursor with a mixture including 50 wt. % acetone 20 wt. % dimethylformamide, 20 wt. % isopropanol and 10 wt. % water to form a mixed metal oxide; and removing volatile components.

2. The process as recited in claim 1 wherein the first organometallic reactant is an organotantalum.

3. The process as recited in claim 1 wherein the first organometallic reactant is an organoniobium.

4. The process as recited in claim 1 wherein the second organometallic reactant comprises an organoaluminum.

5. The process as recited in claim 1 wherein the non-aqueous solvent is selected from the group consisting of toluene; xylene; and benzene.

6. The process as recited in claim 1 wherein forming the precursor further includes exposing the mixture of first and second organometallic reactants for 8 hours under exposure to ultraviolet light at 80° C.

7. The process as recited in claim 1 wherein the first organometallic reactant comprises tantalum alkoxide beta-diketonate and the second organometallic reactant comprises aluminum isopropoxide.

8. The process as recited in claim 1 wherein the precursor comprises the first organometallic reactant and the second organometallic reactant in a 1:1 mole ratio or greater.

* * * * *